Dec. 15, 1931.  H. K. LORENTZEN  1,836,764
DUPLICATOR
Original Filed March 25, 1926   10 Sheets-Sheet 1

Fig.1.

Inventor
Hans K. Lorentzen
By Ramsey and Kent
Attorneys

Fig. 2.

Dec. 15, 1931.  H. K. LORENTZEN  1,836,764
DUPLICATOR
Original Filed March 25, 1926  10 Sheets-Sheet 5

Inventor
Hans K. Lorentzen
By Ramsey and Kent
Attorneys

Dec. 15, 1931. H. K. LORENTZEN 1,836,764
DUPLICATOR
Original Filed March 25, 1926 10 Sheets-Sheet 6

Inventor
Hans K. Lorentzen
By Ramsey and Kent Attorneys

Dec. 15, 1931. H. K. LORENTZEN 1,836,764
DUPLICATOR
Original Filed March 25, 1926 10 Sheets-Sheet 10

Inventor
Hans K. Lorentzen
By Ramsey and Kent Attorneys

Patented Dec. 15, 1931

1,836,764

UNITED STATES PATENT OFFICE

HANS K. LORENTZEN, OF NEW YORK, N. Y.

DUPLICATOR

Original application filed March 25, 1926, Serial No. 97,189. Divided and this application filed May 21, 1930. Serial No. 454,213.

This invention relates to duplicators, especially to that type of duplicators in which the gelatinized surface is formed on the periphery of a rotatable cylinder.

It is an object of the invention to provide improved and simple means for feeding the blank sheets of paper into the machine in proper timed relation to the cycle of operation of the machine and further to provide mechanism for smoothly pressing the sheets against the gelatinized surface.

Another feature of the invention resides in the means for automatically stripping the sheets from the gelatinized surface and positively discharging them from the machine.

Other features are found in the arrangement of parts facilitating the adjustment and replacement of the gelatin rolls, as well as in the means for controlling the movement of the revolving drums.

While I have disclosed a preferred embodiment of the machine for purposes of illustration, it should be understood that the structure may be modified in various ways without departure from the true spirit and scope of the invention as hereinafter defined and claimed.

This application is a division of application Serial No. 97,189, filed March 25, 1926.

The framework of the machine includes two side frames 10 connected by suitable tie members and carrying in journals the impression drum 11. The left end of the impression drum carries the gear teeth 12 which mesh with teeth 13 formed on the stripper drum 14, the latter also being journaled in the framework. The stripper drum is driven through a reduction gear 15 by an electric motor 16.

The impression drum is composed of two end members 17 and 18 and a peripheral surface 19 that extends over more than half of the circumference of the drum. The peripheral surface is covered by a layer of felt 20 to provide a cushion support for the gelatin paper 21. The gelatin paper after passing over the peripheral surface of the drum is carried around a guide roller 22 located at each end of the surface 19, and has one of its ends attached to the hollow delivery spindle 23 and its opposite end attached to the hollow receiving spindle 24. The end member 18 carries studs 25 adapted to rotatably support one end of each of the spindles 23 and 24. The opposite ends of spindles 23 and 24 are supported and rotated through studs 26 carried by pivoted gates 27 which are identically constructed and move about pivot 28. Each gate is biased to open position by a compression spring 29 and carries an angular projection 30 that limits the opening movement of the gate. The inner part of stud 26 carries a cross pin 31 for engaging notches 32 formed in the end of the spindle. The outer end of the stud is squared at 33 for cooperation with a detachable crank and carries a ratchet wheel 34. A pawl 35, pivoted to cooperate with the ratchet wheel, carries a handle 36 and is provided with a spring 37 arranged to move across dead center and hold the dog in either engaged or disengaged position. The gate is held in closed position by a pivoted spring latch 38.

Figure 1:
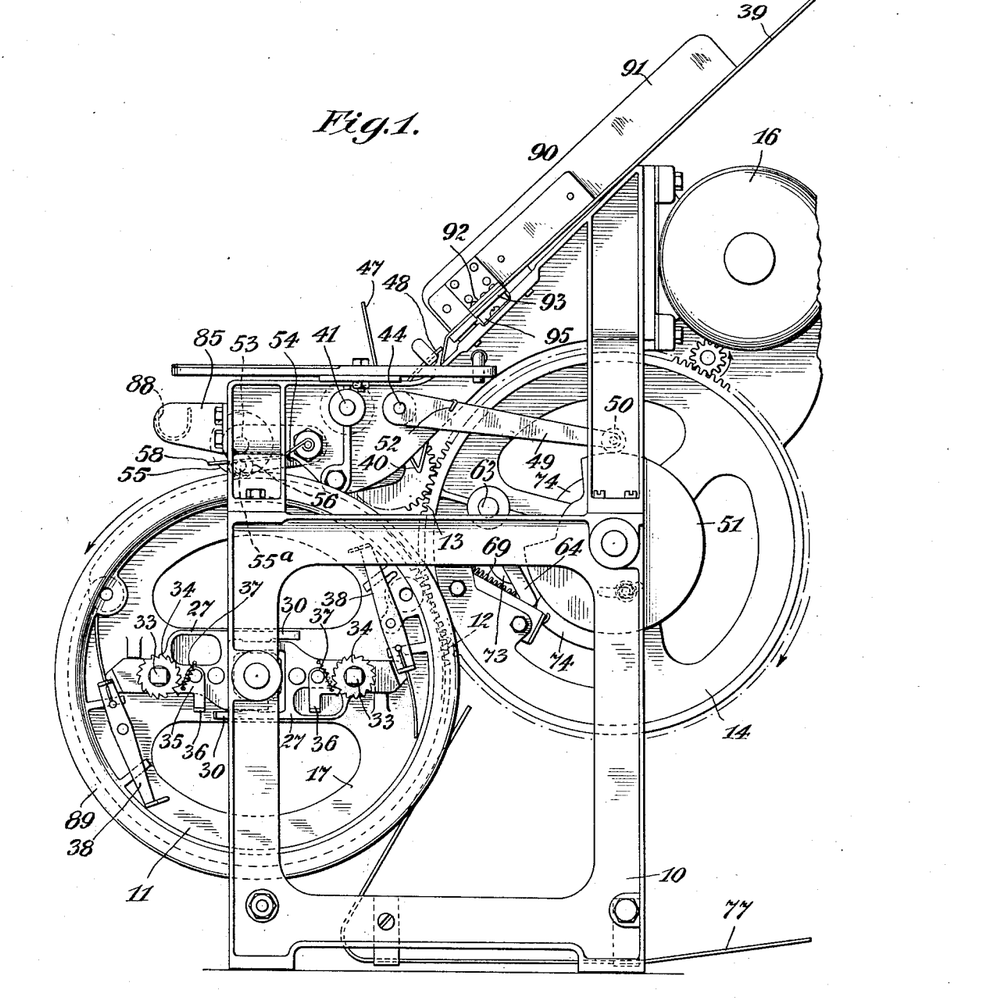
Fig. 1 is an elevation of the right hand side of the machine.
Figure 2:
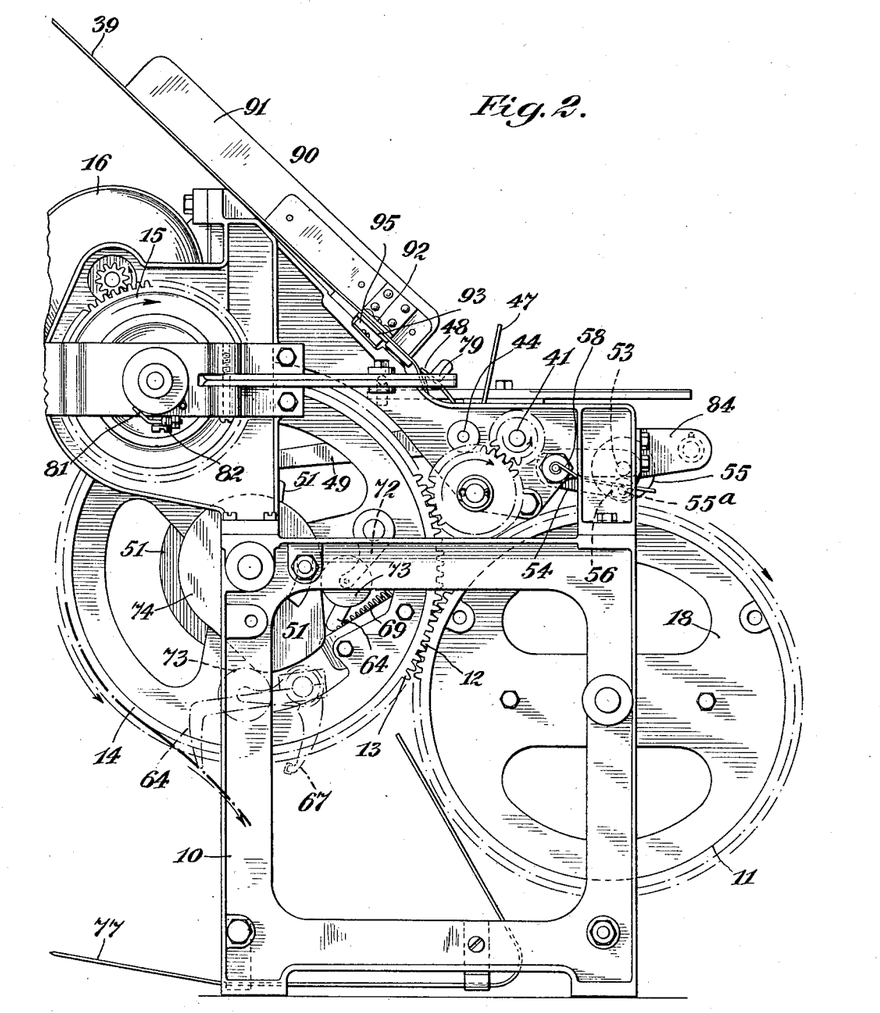
Fig. 2 is an elevation of the left hand side of the machine.
Figure 3:
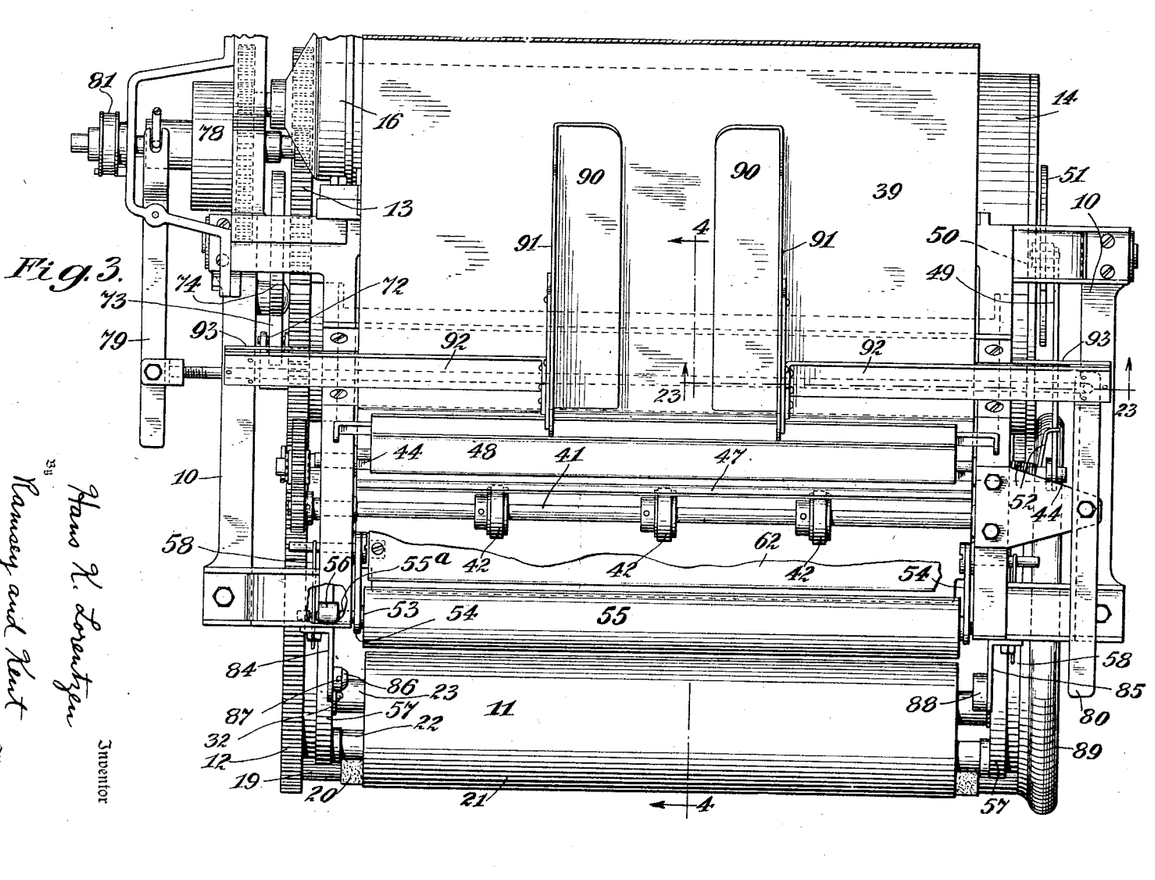
Fig. 3 is a top plan view of the machine.
Figure 4:
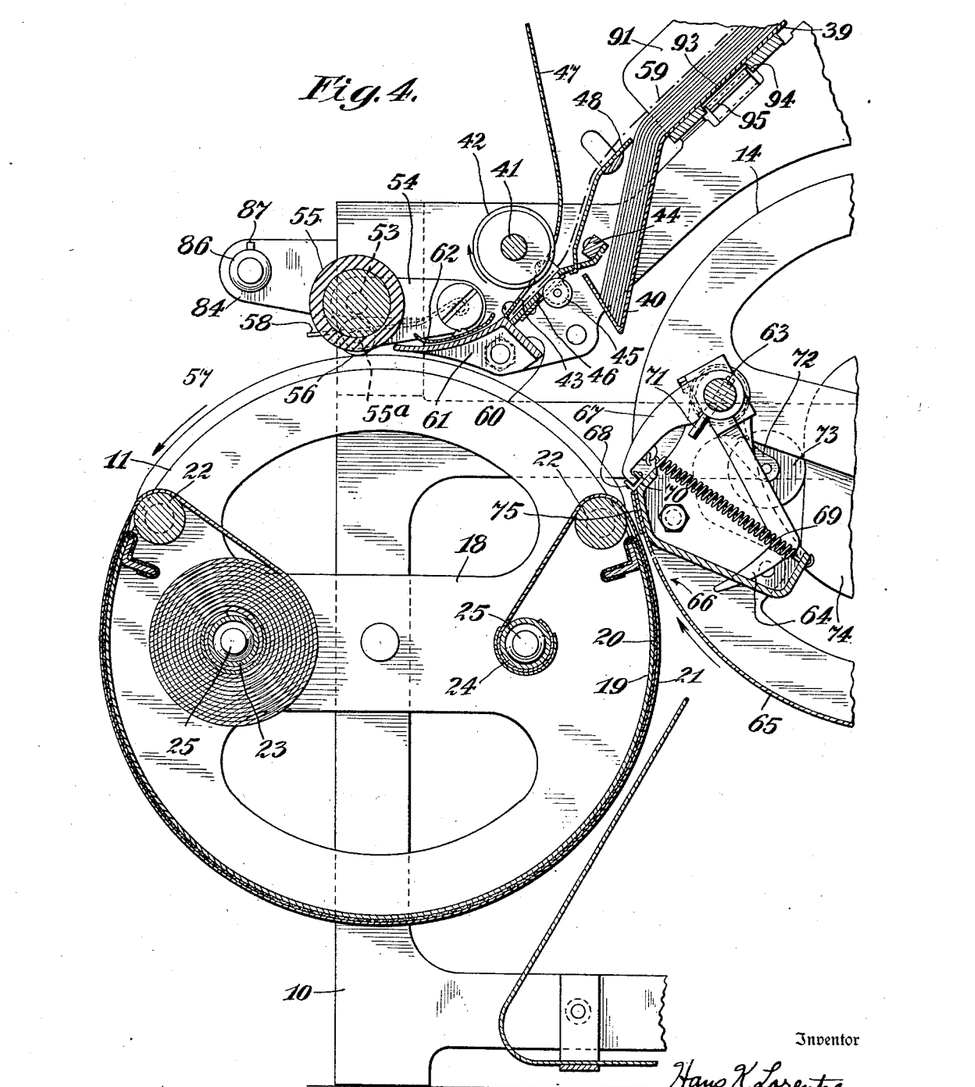
Fig. 4 is a central vertical section on the line 4—4 of Fig. 3.
Figure 5:
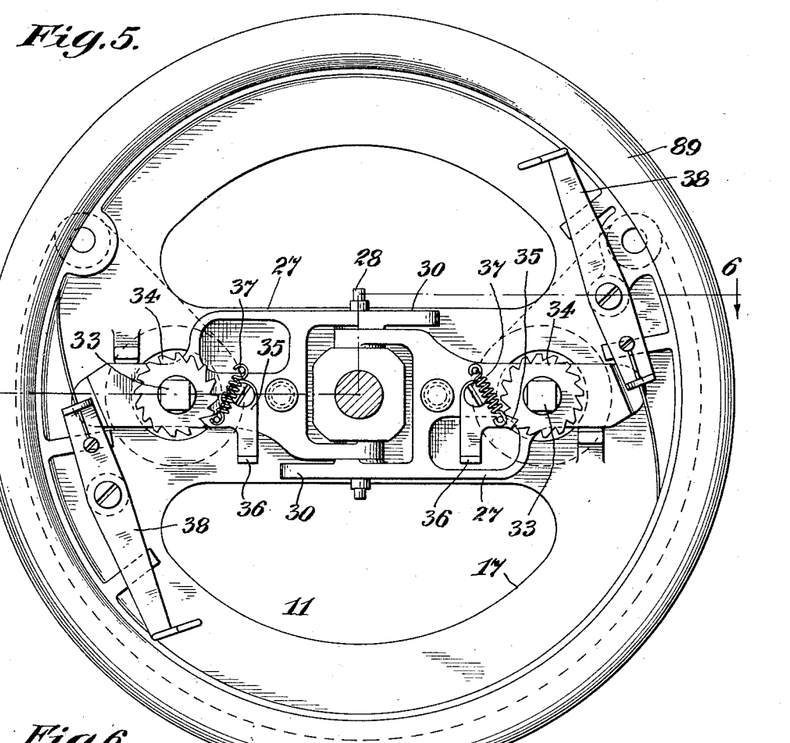
Fig. 5 is an elevation of the right hand side of the impression drum and shows the mechanism for securing the gelatin spindle rolls.
Figure 6:
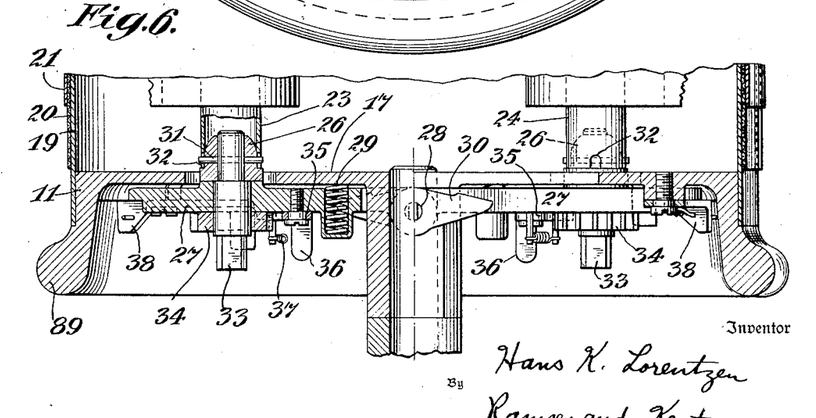
Fig. 6 is a horizontal section on the line 6—6 of Fig. 5; and shows the spindle securing mechanism in locked position.

The inclined feed table 39 is attached to the upper part of the framework and carries at its lower end an angular pocket 40 (Fig. 4) adapted to hold the sheets which are to receive the impressions. The shaft 41, which extends across the frame in front of pocket 40, carries the feed rolls 42 and is driven from stripper drums 14 by gearing arranged to give rolls 42 the same peripheral speed as that of the impression drum 11. The delivery chute 43, which is carried by shaft 44, has idler rolls 45 extending through its lower member 46 and has a curved upper guard member 47. An apron 48 is loosely supported on the member 46 and falls by gravity against the sheets in the pocket.

Shaft 44 carries at one end an arm 49 having a roller 50 cooperating with a cam 51 adjustably mounted on the stripper drum 14. A spring 52 tends to depress the arm 49.

A shaft 53 is mounted on the pivoted arms 54 and carries the platen roller 55. Each of the arms 54 carries a stub shaft 55$^a$ on which is journaled a roller 56 cooperating with a cam 57 on the impression drum 11. A spring 58 tends to depress arms 54.

Figures 17, 19:
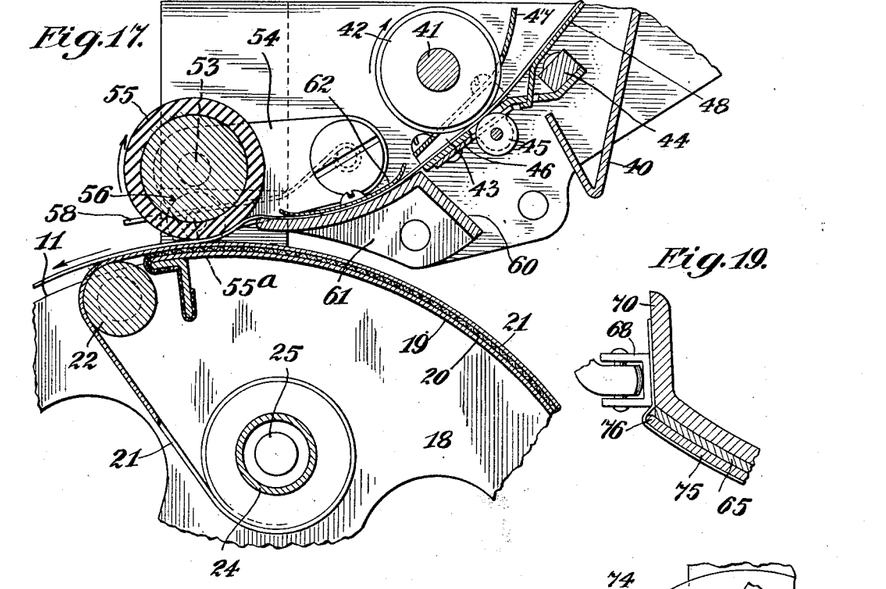
Fig. 17 is a fragmentary view showing details of the feeding mechanism.
Fig. 19 is a detail view showing the manner in which the gripper fingers grip the paper.

During the operation of the machine the top sheet of paper is lifted from the stack in the pocket until it is free from the apron. It is then allowed to fall down over the apron into the delivery chute to the dotted line position 59. When the chute is in the position shown in Fig. 4 its lower end is closed by the surface 60 formed on the stationary guide 61. The chute is held in this position as long as roller 50 rides on the raised periphery of cam 51. As the surface 19 of the impression drum approaches the platen roller, roller 50 falls into the depressed portion of cam 51, and the chute is elevated to delivery position as shown in Fig. 17. In this position the idler rolls 45 press the sheet against feed rolls 42 which feed it through stationary guides 61 and 62 into contact with the platen roller. Just after the sheet has passed under the platen roller the rollers 56 are allowed to descend by cams 57, thereby causing the platen roller to press the sheet against the geletin paper on surface 19. It will be noted that the delivery of the sheet is so timed that its forward edge projects beyond the gelatinized surface. It should further be noted that the paper is directed in such a manner that it first contacts with the platen roller which presses it evenly and positively against the gelatinized surface. This procedure avoids trapping air between the paper and the gelatinized surface of impression roll and insures an even impression.

Figures 12, 13, 14, 15, 16:
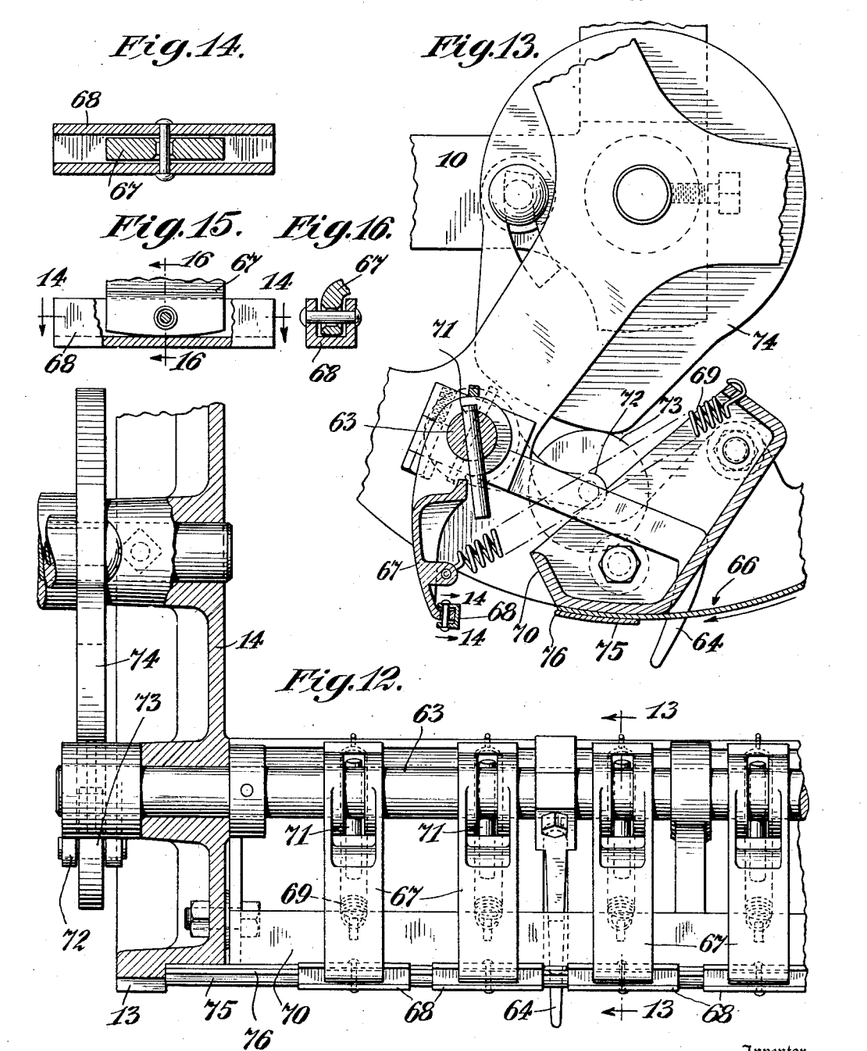
Fig. 12 is a fragmentary view of the stripper drum.
Fig. 13 is a section taken on line 13—13 of Fig. 12 and shows the gripper fingers in open position.
Figs. 14 to 16 are detail views showing the manner of mounting the heads on the gripper fingers.

The stripper drum carries near its periphery a shaft 63 upon which are mounted a plurality of angular stripper fingers 64. These stripper fingers normally lie below the surface 65 of the drum, but at a certain position of the shaft 63 they project through openings 66 in the surface 65. The shaft 63 also carries loosely journaled thereon a plurality of gripper fingers 67, the ends of which carry heads 68 universally pivoted thereon as shown in Figs. 14–16. A spring 69 normally holds each gripper finger in the position shown in Fig. 4 with its head in contact with a surface 70, extending inwardly at an angle from the surface of the drum. The shaft carries a pin 71 adapted to engage the finger 67 upon certain movement of shaft and move the finger outwardly to the position shown in Fig. 18. An arm 72 is mounted on one end of shaft 63 and carries a roller 73 riding along a stationary cam 74 mounted on the framework of the machine.

Figure 18:
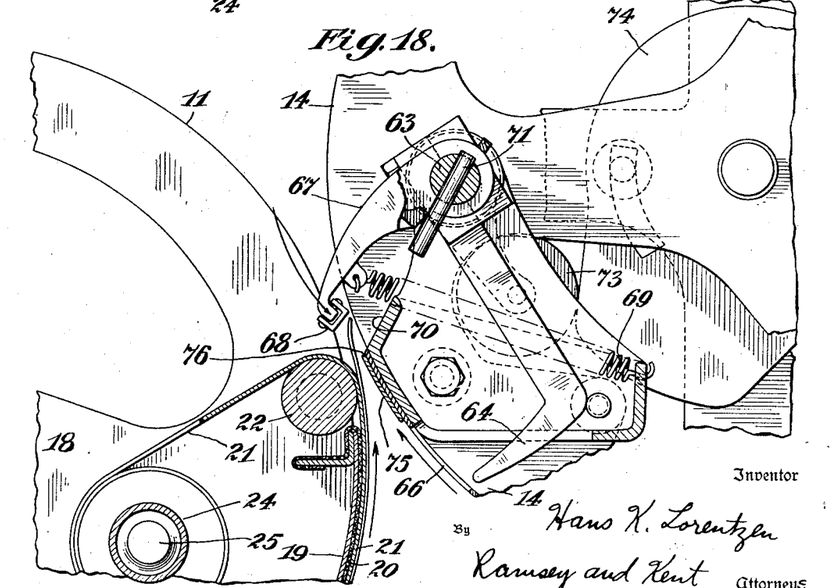
Fig. 18 is a fragmentary section showing the gripper fingers about to grip the free end of the printed sheet.
Figures 20, 21, 22:
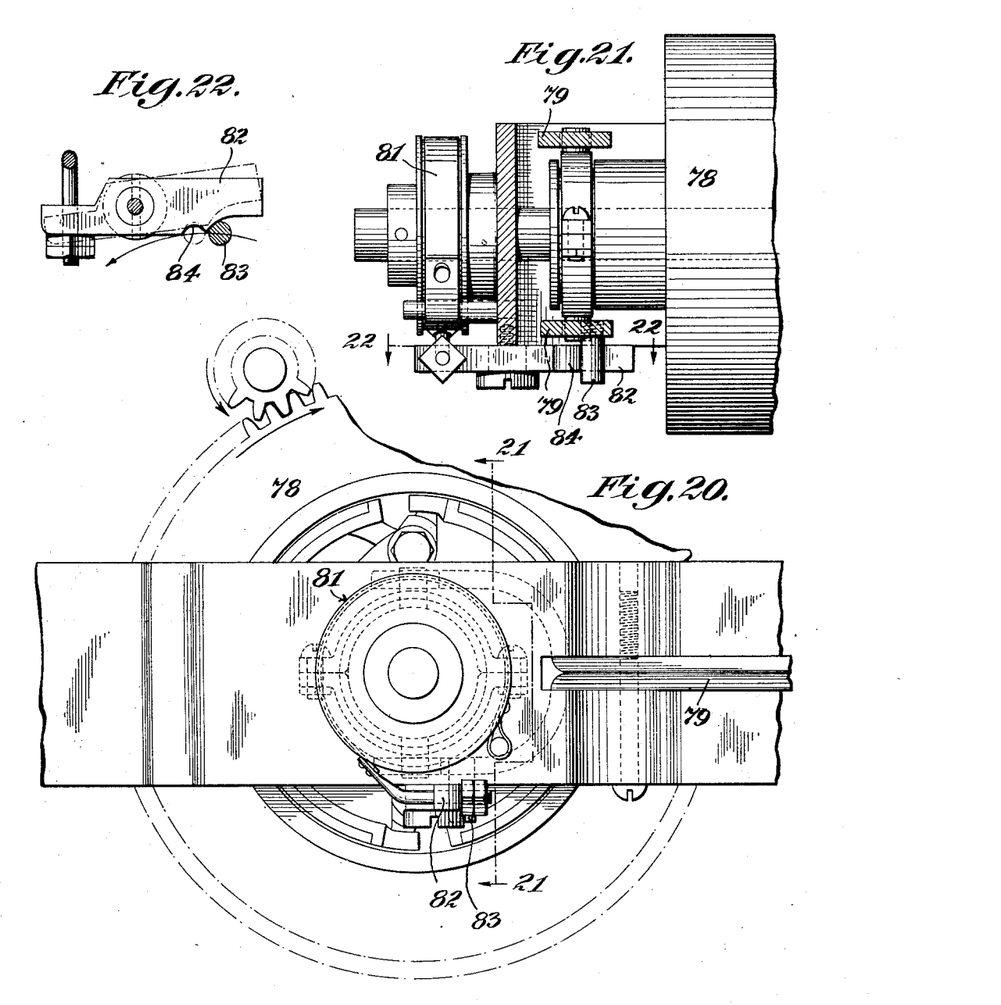
Figs. 20 to 22 are detail views of the clutch and brake mechanism.

After the sheet of paper has been rolled into contact with the impression drum it is carried by said drum until it reaches the position shown in Fig. 18, and meanwhile the stripper drum has assumed the position illustrated. As the drums continue to rotate the roller 73 rides down off the high part of cam 74, permitting springs 69 to close the gripping fingers upon the projecting end of the sheet as shown in Fig. 19.

It should be noted that the snubbing member 75 provides a projecting ledge 76 which acts as a sort of snubbing post about which the sheet of paper is bent to give added firmness to the grip of the gripping fingers. The use of a plurality of spring-pressed gripper fingers provides for a uniform metal-to-metal grip along the end of the sheet.

As the stripper drum continues to rotate it will carry the sheet along with it until the roller 73 again rides up the high part of the cam 74, thereby causing the gripper fingers to release the sheet and moving the gripper fingers outwardly to positively push the sheet from the stripper roll. This positive discharge of the sheet prevents its adhesion to the roll on account of static electricity or any other cause. The sheets are discharged into the pan 77.

The motor 16 is connected to the driving gears by a clutch 78 of a conventional type which is controlled by lever 79. A second control lever 80 is pivoted on the opposite side of the frame and is connected to lever 79, so that the clutch can be operated from either side of the machine. A brake 81 is mounted on the outer end of the clutch shaft and is operated by a lever 82. A pin 83 is carried by lever 79 and is adapted to move lever 82 to braking position and to hold the lever in such position by engaging in a notch 84 formed in lever 82. When lever 79 is in one extreme position the clutch is thrown into engagement; when it is in central position the clutch is disengaged; while when it is in the other extreme position the brake is applied and locked in braking position.

It will be understood that the matter to be reproduced is impressed upon the gelatinized surface in a well-known manner. After a run has been made from one section of the gelatin paper it is desirable to bring a fresh section into position. In performing this operation the brake is first applied and locked, thereby holding the drums immovable. The pawl 35 controlling the delivery spindle 23 is then thrown out of engagement with its ratchet the crank is applied to the shaft 33 of receiving spindle 24, and the used portion of the gelatin paper is wound on to the receiving roll. The pawl 35 is then returned to stop rotation of spindle 23 and spindle 24 is further rotated to tighten the gelatin paper upon the drum.

Figure 8:
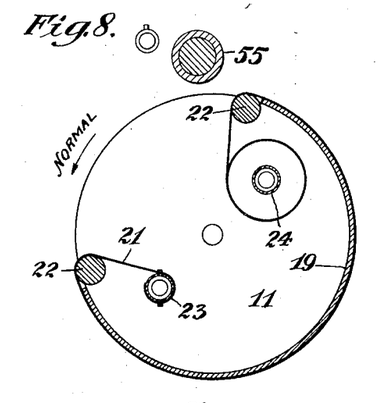

After all of the gelatin paper has been used over and has been wound onto the receiving roll, as shown in Fig. 8, it becomes necessary to interchange the position of the rolls, if the gelatin paper is capable of further use, or to insert a fresh roll. In order to facilitate this interchange alining and supporting brackets 84 and 85 are attached to the frame above the impression drum. Bracket 84 carries a stub 86 adapted to fit within the spindle and having a pin 87 adapted to engage the notches formed in the spindle, while bracket 85 carries a U-shaped saddle 88.

Figures 7, 10, 11:
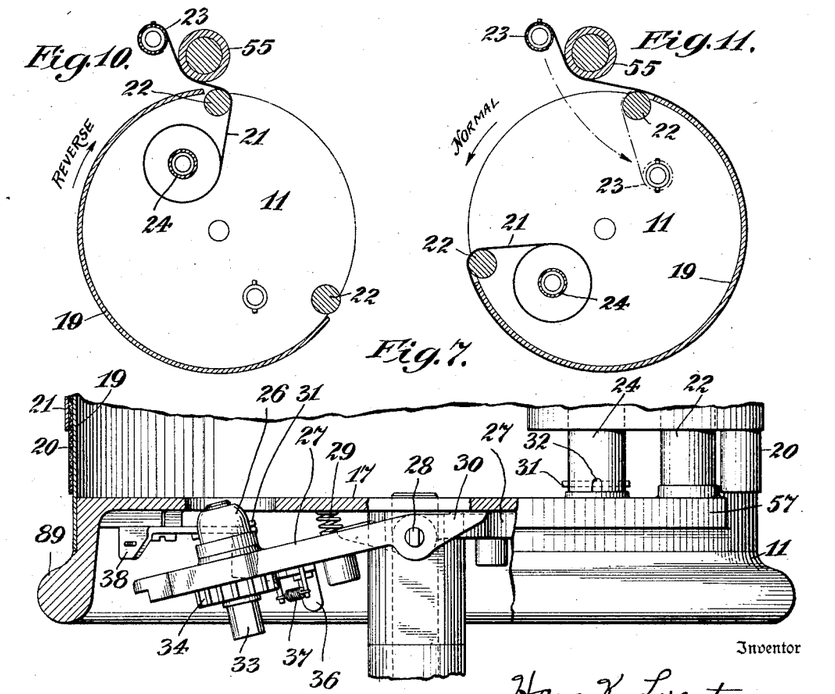
Fig. 7 is a view similar to Fig. 6 but shows one of the spindles removed and its pivot gate in unlocked position.
Figs. 8 to 11 are diagrammatic views of the impression drum and gelatin rolls mounted therein showing the procedure for interchanging the gelatin rolls.
Figure 9:
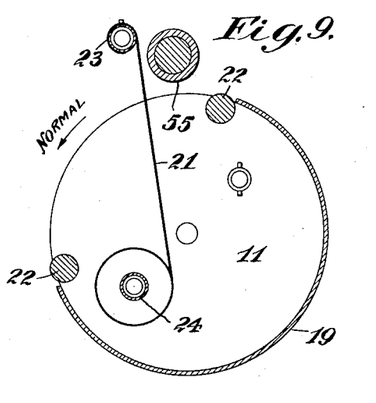

With the impression drum locked in the position illustrated in Fig. 8, the gate 27 holding the delivery spindle 23 in position is opened and this spindle is removed from the drum and the end of the paper is detached therefrom. This spindle is now placed in the brackets 84 and 85. The spindle 24 carrying the paper thereon is now removed from the receiving position and is placed in the delivery position as shown in Fig. 9. If necessary a fresh gelatin roll is placed in the delivery position. The end of the gelatin paper is now placed around the spindle on the alining brackets and is attached by a spring clip. The alining brackets are accurately positioned so that when the spindles are in the positions of Fig. 9 they are exactly parallel, and hence the paper will be properly alined upon the receiving spindle. The brake is now released and the impression drum is moved by hand, rim 89 being provided for this purpose, in the reverse direction as shown in Fig. 10 to lead the gelatin paper across the surface of the drum. This reverse rotation is continued until the parts reach the position shown in Fig. 11, when the brake is again locked. The spindle on the alining brackets is now placed in the receiving position within the drum and the paper is tightened as previously explained.

Figure 23:
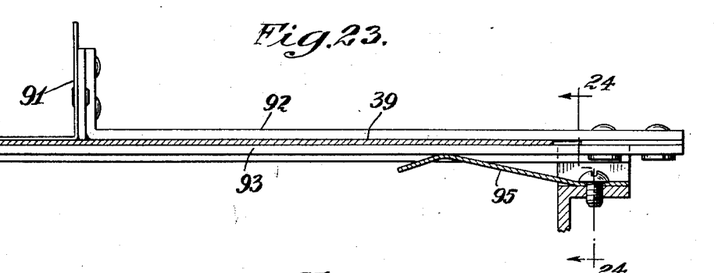
Figs. 23 to 25 are detail views of one of the adjustable paper guides.
Figure 24:
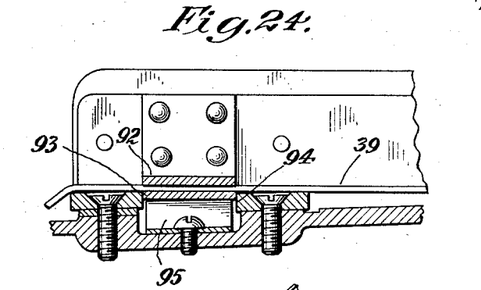
Figure 25:
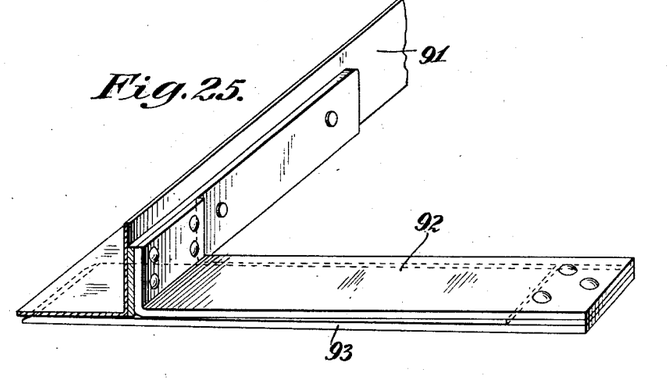

The feed table 39 carries two paper guides 90 composed as shown in Figs. 23 to 25, of an L-shaped guide member 91, and a supporting arm 92. A spring arm 93 is adapted to ride in a guide-way 94 formed below the table and frictionally grip the table. To further improve the frictional grip a spring 95 is mounted on the framework of the machine and presses against the spring arm 93. The guide is thus accurately alined by the guide-way 94 and is frictionally held in any working position without the use of set screws or similar fastening devices.

It will be clear from the above description that the duplicator is adapted to be rotated continuously by the electric motor, although it can be instantly stopped by movement of either lever 79 or lever 80. The sheets are fed by hand into the delivery chute which delivers them at exactly the proper time to the feed rolls, which are moving at the same peripheral speed as the impression drum. The feed rolls deliver the sheet to the platen roller which presses the paper evenly and with uniform pressure upon the impression drum. As the impression drum rotates the projecting end of the sheet is grasped by the gripper fingers and the sheet is smoothly pulled from the gelatinized surface of the impression drum and is carried around by the stripper drum until the gripper fingers release the sheet and the stripper fingers positively discharge it from the stripper drum.

The construction of the impression drum provides for easy replacement and adjustment of the gelatin rolls, while the alining brackets insure even winding of the paper upon the receiving spindle.

I claim:

1. In a rotary duplicator, a stripper drum, a shaft carried within said drum, gripper fingers loosely mounted on the shaft, pins mounted on the shaft for moving the gripper fingers, heads mounted for universal movement on the gripper fingers, and springs for normally holding the gripper fingers in contact with the drum.

2. In a rotary duplicator, a stripper drum, a shaft carried within said drum, gripper fingers loosely mounted on the shaft, pins mounted on the shaft for moving the gripper fingers, heads mounted for universal movement on the gripper fingers, springs for normally holding the gripper fingers in contact with the drum, and stripper fingers mounted on the shaft.

HANS K. LORENTZEN.